Figure 3:
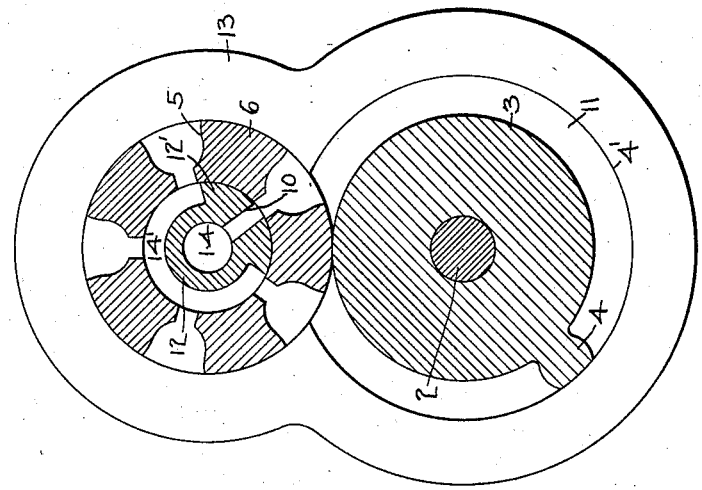

S. J. JOHNSON.
ROTARY ENGINE WITH PISTON OF VARIABLE AREA.
APPLICATION FILED APR. 8, 1911.
1,021,720.
Patented Mar. 26, 1912.
4 SHEETS—SHEET 1.
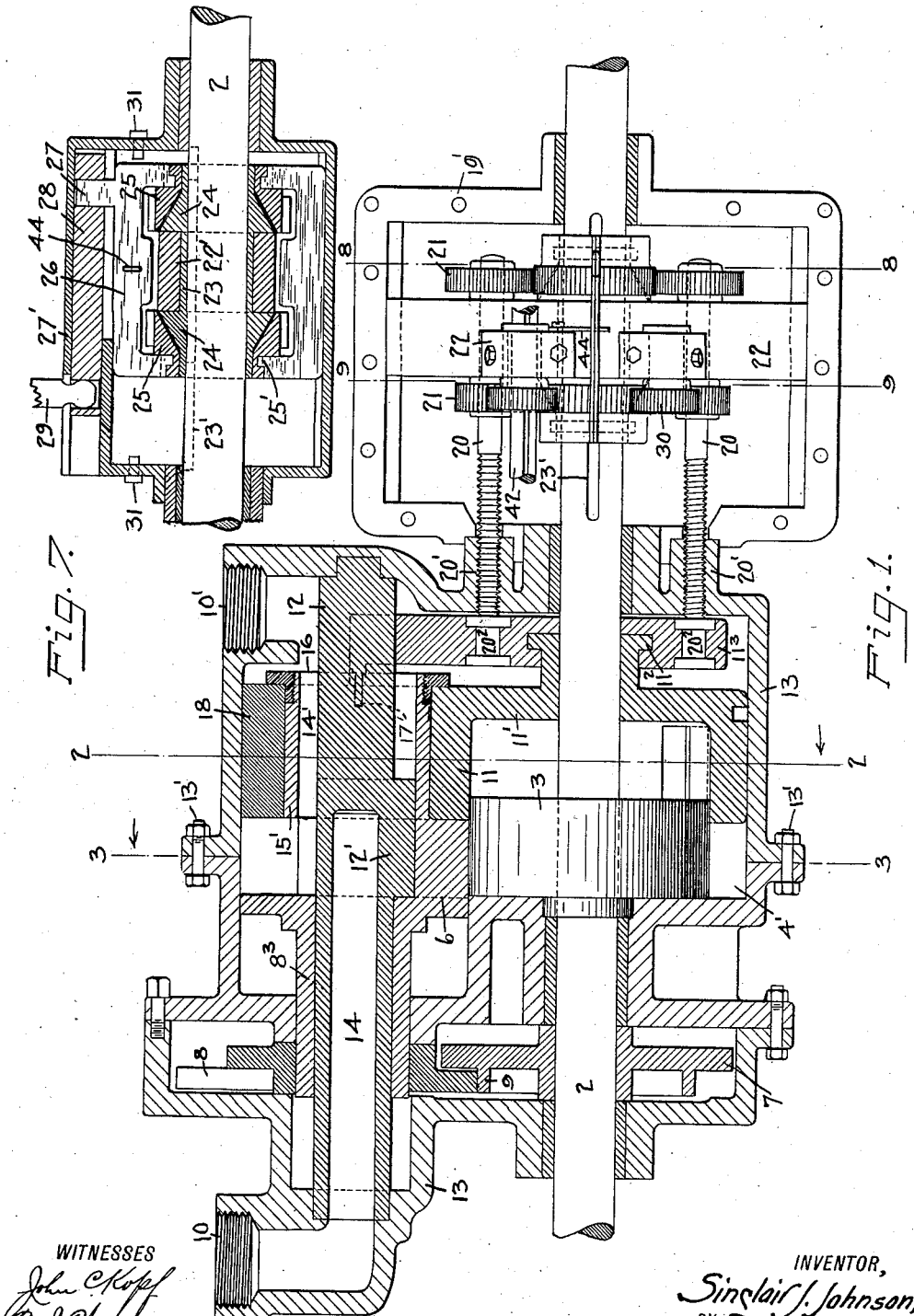

S. J. JOHNSON.
ROTARY ENGINE WITH PISTON OF VARIABLE AREA.
APPLICATION FILED APR. 8, 1911.
1,021,720.
Patented Mar. 26, 1912.
4 SHEETS—SHEET 2.
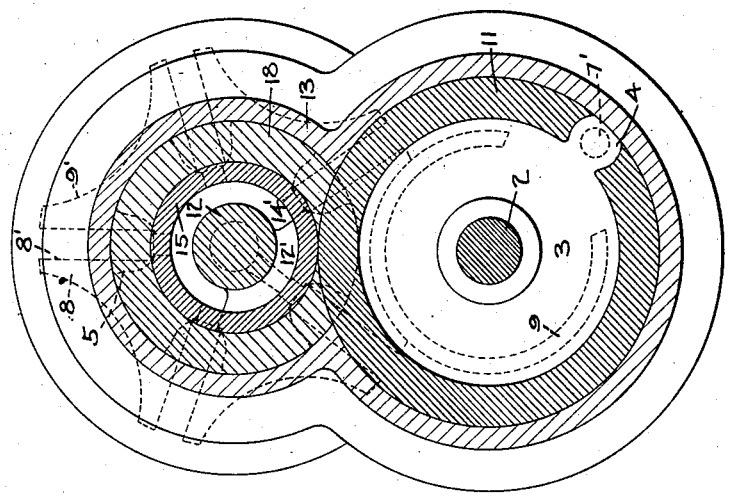
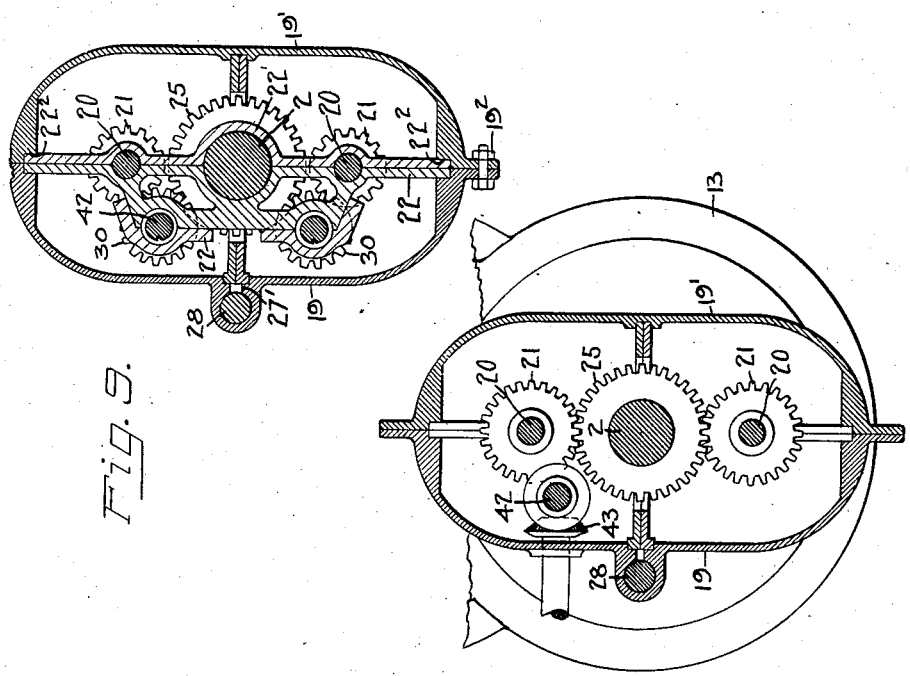
WITNESSES
INVENTOR,
Sinclair J. Johnson,
BY
HIS ATTORNEY.

S. J. JOHNSON.
ROTARY ENGINE WITH PISTON OF VARIABLE AREA.
APPLICATION FILED APR. 8, 1911.

1,021,720.  Patented Mar. 26, 1912.
4 SHEETS—SHEET 3.

WITNESSES:

INVENTOR,
Sinclair J. Johnson,
BY
HIS ATTORNEY.

S. J. JOHNSON.
ROTARY ENGINE WITH PISTON OF VARIABLE AREA.
APPLICATION FILED APR. 8, 1911.
1,021,720.
Patented Mar. 26, 1912.
4 SHEETS—SHEET 4.
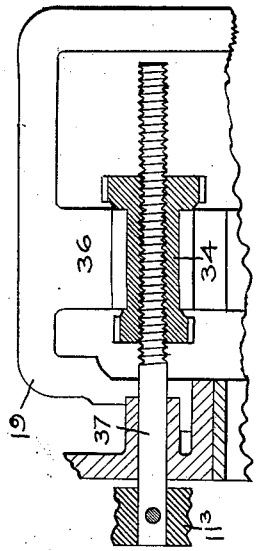
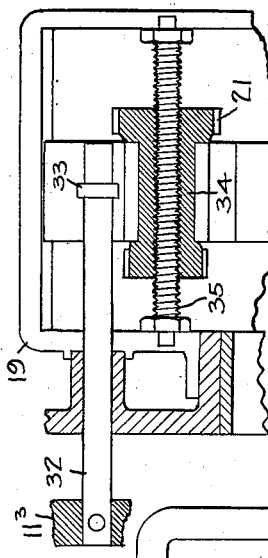
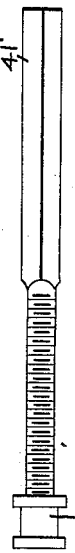
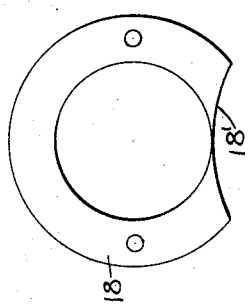
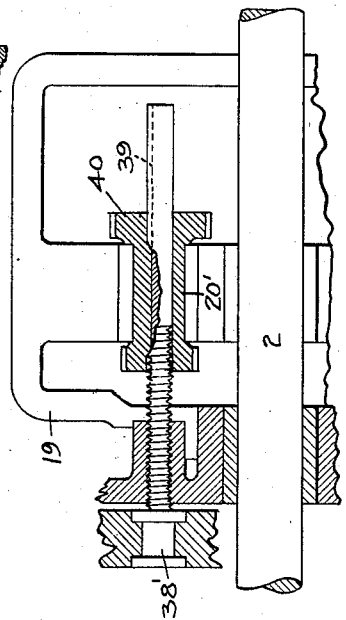
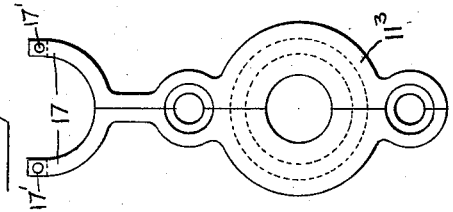
WITNESSES
INVENTOR,
Sinclair J. Johnson,
BY
Pierson L. Nelly
HIS ATTORNEY.
COLUMBIA PLANOGRAPH CO., WASHINGTON, D. C.

UNITED STATES PATENT OFFICE.

SINCLAIR J. JOHNSON, OF MONTCLAIR, NEW JERSEY.

ROTARY ENGINE WITH PISTON OF VARIABLE AREA.

1,021,720.                    Specification of Letters Patent.    Patented Mar. 26, 1912.

Application filed April 8, 1911. Serial No. 619,678.

*To all whom it may concern:*

Be it known that I, SINCLAIR J. JOHNSON, of Montclair, New Jersey, have invented a certain new and useful Improvements in Rotary Engines with Pistons of Variable Area, of which the following is a specification.

There is disclosed in Patent No. 714,582, granted to me on Nov. 25, 1902, a rotary engine of the wing piston type in which the annular chamber or cylinder swept through by such piston is intersected by the similar chamber traversed by the abutment-forming projections on an intermittently rotative member. As shown in that patent, these projections are separated by intervening spaces of such configuration, relatively to the piston wing, that a pressure tight joint is preserved between the walls of the wing and the walls of the recesses as the wing enters and passes out of each recess in succession, this orderly coöperation of the piston and recesses due to the intermittent rotation of the abutment-provided member from the moving piston shaft through the medium of an intermittent driving mechanism which additionally operates to lock the abutment-provided member from rotation during such times as the piston walls are not in engagement with the walls of a recess. The present invention is applied to the engine of said patent and renders it possible to manually control the area of the wing piston thereof with the result that the capacity of such engine with any given pressure of motive fluid may be changed at will. The device may obviously be used as a pump, that is as a driver or as a driven mechanism.

One of the principal features involved in the application of the invention consists in the mounting of an annulus which by a shifting movement axially of the piston axis of the aforedescribed engine may be caused to fill to the desired extent the annular space swept through by the uncovered wing of the engine, thus increasing or decreasing at will the effective area of such wing. This annulus is slotted or recessed to slide along the faces of the wing, which latter, therefore, may as desired, be covered or uncovered to a greater or less extent by the annulus. Provision also exists for causing the abutment-provided member to properly coöperate with the wing piston of the engine whatever the effective area given to the piston while entrance and exhaust of the motive fluid, etc., may be effected by substantially the same means and in the manner set forth in said patent.

Figure 4:
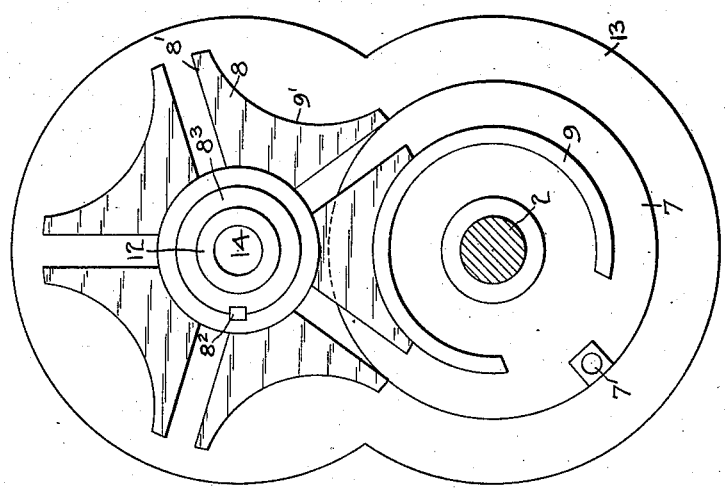

In the drawing accompanying the present specification, Figure 1 is an axial longitudinal section through a rotary engine with piston of variable area embodying the features of my improvements. Fig. 2 is a section on the plane of the line 2—2 in Fig. 1, looking in the direction of the arrow adjacent to that line. Fig. 3 is a section on the plane of the line 3—3 in Fig. 1, looking in the direction of the arrow adjacent to that line. Fig. 4 is a view looking toward the right in Fig. 1, the end plate of the engine casing being removed. Fig. 5 is a face view of the filler ring for the abutment-provided member. Fig. 6 is a face view of the adjuster for the piston-cut-off ring. Fig. 7 is a sectional view longitudinally of the axis of the main shaft showing the manually controlled clutch mechanism for effecting the shifting movement of the said adjuster from the rotating main shaft. Fig. 8 is a section on the plane of the line 8—8 and Fig. 9 on the plane of the line 9—9 in Fig. 1, looking toward the left. Fig. 10 is a sectional detail of that form of adjuster shifting mechanism in which a rotary but longitudinally immovable nut is geared to the main shaft through the clutch, the manual control lever having, then, but two positions to effect the full traverse of the threaded rod in the nut in one direction or the other. Fig. 11 is a similar view of that form of the shifting mechanism in which the threaded rod is fixed, the geared nut traveling to one end or the other thereof, thus necessitating for full traverse of the nut that the manual control lever be constantly pressed in the direction in which it is shifted in order to follow the moving nut. Fig. 12 is a similar view of a modified construction of Fig. 10, the same embodying a key and key way connection between the geared nut and the threaded rod. Fig. 13 shows a squared rod as an equivalent of the slotted rod disclosed in Fig. 12.

Similar characters of reference designate corresponding parts in all figures.

The main features of the present illustrated engine are similar to the corresponding features of the engine disclosed in my mentioned patent to which reference may be had for a more detailed description, such features as are common to the two constructions being here briefly referred to only. That is to say, secured to a main shaft 2 is a disk 3 having a radial projection 4 constituting a wing piston adapted to sweep through an annular space $4^1$ forming a chamber or cylinder. This piston is adapted to enter and pass out of each of a number of recesses 5 formed in a member 6, the configuration of the piston and the walls of the recesses being such that a fluid tight joint is formed during the combined rolling and sliding of the surfaces, it being obvious that suitable packing, not shown, may be used when desired for the purpose of practically effecting this result. The piston is caused to engage in succession with the recesses by the intermittent movement of the member 6 imparted from the continuously moving shaft 2 by a star wheel device, so called, here shown as embodying a pin $7^1$ extending axially from a disk 7 secured to shaft 2 and adapted to engage with slots $8^1$, in succession, radially formed in a disk 8, here connected for purposes that will presently appear by a key and key way device $8^2$ with a sleeve-like projection $8^3$ of member 6. The main portion of disk 7 in the plane of pin $7^1$ transverse to the main shaft is filled with a circular lateral extension 9 which coöperates with the walls of concave recesses $9^1$ intervening between slots 8 in the usual manner to lock member 6 from rotation during such times as piston 4 is not in engagement with a recess 5. As the walls of the recess 5 from which the piston is receding constitute an abutment for the motive fluid, member, herein called an abutment-provided member is locked against movement and positively moved, intermittently, by the said star-wheel connection, in such manner as to produce a continuous rotation of the main shaft. The motive fluid may be admitted at the rear of the advancing piston and exhausted from in advance thereof by the means disclosed in my mentioned patent, inlet and exhaust connections being indicated at 10 and $10^1$, respectively.

Referring now to that which constitutes the principal feature of the present improvements, 11 designates an annulus whose internal bore is such as to form a snug sliding joint with the periphery of disk 3 and the thickness of the shell of which is equal to the dimension, measured radially, of the cylinder or chamber $4^1$. This annulus is interrupted at one point in its periphery where it is slidably fitted to the side walls of the piston, thus enabling the annulus to be shifted to and fro axially of disk 3 and thereby increase or decrease the effective area of the piston. The annulus thus acts as a piston-cut-off and for the purpose of so shifting this cut-off the hubbed radial part $11^1$ thereof is slidably mounted on the main shaft 2 and provided with a collar $11^2$ concentric with the axis of the main shaft. Engaging with this collar is a cut-off shifter $11^3$, the collar having a sliding fit in an undercut annular recess in the shifter. This latter is made in two parts, see Fig. 6 and its position obviously determines the position of the cut-off longitudinally of the axis of the main shaft, the construction being such that the cut-off may freely rotate (by reason of the engagement of the latter with the piston as described) notwithstanding that the adjuster is held from rotation by the shifting means presently to be described. In the present instance, abutment-provided member 6 is moved to and fro in synchronism with the movement of cut-off, it being plain that the circumscribing circle of annulus 11 intersects the circumscribing circle of member 6. That is to say, this said member is axially and rotatively mounted on a journal 12 fixed at its ends within the engine casing 13, shown as made in parts and secured together by bolts $13^1$. At one side member 6 is extended in the form of a sleeve $8^3$ with which the star wheel device has a key and key way connection, as already described. The main or enlarged part $12^1$ of fixed journal 12 forms with the sleeve projection $8^3$ a shoulder which defines the stop position of the member to the right in Fig. 1, corresponding to a full effective area of the piston. Ports 14 and $14^1$, within and without journal 12, communicate, respectively, with described connections 10 and $10^1$, the former port being within an axial tubular extension 15 of member 6.

The circumscribing circle of cut-off annulus 11 is substantially tangent to the circumscribing circle of tubular extension 15, thus leaving cut-off free to rotate with the rotating piston but compelling member 6 to move to the left in Fig. 1 with the leftwardly moving cut-off (since the abutment-forming projections extend beyond said latter circle) reverse movement with the cut-off resulting from the engagement of the cut-off with a collar 16 secured to the end of tubular extension 15. Preferably, however, in order to minimize cross or cramping strains on journal 12 which would practically accompany the action of the cut-off as a means for longitudinally shifting member 6, I bifurcate shifter $11^3$, see 17, 17, Fig. 6, to encircle journal 12 and connect the two arms of the bifurcation with diametrically opposite sides of the collar 18, as by pins $17^1$, $17^1$.

In order to shut off all recesses 5, except the one coöperating at any given time, from port $14^1$, tubular extension 15 is encircled by a filler ring 18 which has an arc-shaped portion, see $18^1$, removed to accommodate cut-off annulus 11.

The power for adjusting shifter 12 may be supplied by the operator, or such power may be derived from the rotating main shaft under the control of the operator. The shifter adjustment apparatus may be designed for both methods of effecting such adjustment since manual adjustment is necessary when the engine is not running, and it is desirable to start with some other position of the piston cut-off than that in which it was left when the engine stopped. This dual mechanism is the one illustrated. In a general way this adjustment embodies a threaded rod, one or more, geared to the main shaft through a pair of clutches for direct and reverse motion under the control of a manually operative lever. This rod may be mounted for rotation in a fixed nut in which event a gear affixed thereto and rotatively mounted on a traveling carriage which is compelled to move axially therewith will so move, provided the gear and clutch on the main shaft are so mounted as to be free and compelled to partake of the movement of the carriage. The control lever must therefore, be held forcibly in one direction or the other to follow the clutch in its axial movement to continue the adjusting movement once initiated, its position serving as a gage of the axial position of the piston cut-off. The same result follows if the threaded rod is rigidly fixed and the geared nut is rotatively mounted on the carriage, the latter being connected to the shifter by a rod. On the other hand, if the threaded rod engaging with a fixed nut has a key and key way connection with a rotatable but longitudinally immovable driver or actuator geared to the main shaft as before, the gear and clutch on the main shaft will not move axially thereof and no progressive movement of the operating lever in one direction or the other is necessary to continue the initiated movement of the piston cut-off shifter; the same result arises if the said driver or actuator has the form of a nut engaging with the thread of the threaded rod. The former construction, *i. e.,* that whose operation involves the progressive movement of the manual control lever is disclosed in Figs. 1, 7 and 11 and the latter construction, *i. e.* that whose operation is accompanied by no such progressive lever movement is set forth in Figs. 10, 12 and 13. This mechanism is inclosed in a suitable casing here made in two parts 19, 19¹ connected together by suitable fastening devices 19² and affixed to or forming a part of the main or engine casing 13 and in both of which parts main shaft 2 is suitably journaled.

Referring to Figs. 1 and 7, more particularly, 20, 20 designate a pair of threaded rods, the threads on which engage with threaded openings in portions 20¹, 20¹ of casing 13 which portions therefore constitute fixed nuts. Double flanged rod ends 20², 20² are rotatively mounted in cut-off shifter 12, while the opposite end of each rod is provided with a pair of gears 21, 21 on opposite sides of a carriage 22 mounted in guides 22² in casing 19, 19¹ for movement longitudinally of the axis of main shaft 2. Mounted on shaft 2 is a sleeve 23 having a key and key way connection 23¹ therewith and having adjacent to its opposite ends oppositely facing, cone clutch members 24, 24. Sleeve 23 is compelled to move as a unit with carriage 22 by a part 22¹ of the latter. Coöperative with each clutch member 24 is a counterpart member each provided on its periphery with teeth and shiftable to and fro axially of shaft 2 to engage one member 24 or the other (thereby connecting one toothed member 25 or the other to the shaft) by a clutch actuator 26 having inwardly extending rings 25¹, 25¹ which enter corresponding recesses in the hubs of the toothed members 25, 25. An extension 27 of this clutch actuator is adapted to slide lengthwise of a slot 27¹ in a fixed part of casing 19, 19¹, which projects into an opening in a slide bar 28 movable to and fro by the manual control lever 29. One gear 21 of each pair thereof on a threaded rod 20 meshes with the teeth of one of the described toothed members 25 while the remaining gears 21, one on each threaded rod, engages with the remaining toothed clutch member through intermediate or reversing gears 30, 30 mounted on carriage 22. Stops 31, 31 for defining the end position of the described mechanism are indicated.

In the alternative mechanism of Fig. 11, the parts are essentially the same as those described except that the described threaded rod is replaced by a plain rod 32 which is rigidly fixed to the aforesaid cut-off shifter and has a collar 33 mounted in a bearing on the afore-described carriage; also, one direct gear 21 and its reversing gear 30 are one with a threaded nut 34 which engages with a threaded rod 35 secured within casing 19, 19¹. The action of these mechanisms will readily be understood from what has already been described.

In Fig. 10, the carriage takes the form of a rigid bridge piece 36 in casing 19, 19¹ in which is rotatively mounted a nut 34, similar to the nut 34 of Fig. 11, threaded rod 37 being slidably mounted in casing 19, 19¹ and being secured at one end to the cut-off shifter while its opposite, or threaded end engages with the threaded bore of the nut.

In Fig. 12, as compared with Fig. 10, threaded rod 37 of the latter is replaced by a similar rod, double flanged, see 38¹, by means of which the rod is rotatively mounted in the cut-off shifter, the thread of the rod engaging with a fixed nut 20¹ in casing 19, 19¹ and being connected by a key and key way connection 39 with the bore of the nut 40, otherwise like the described nut 34 of Fig. 10. Instead of the connection 39 between the nut and the rod, one embodying the rod 41 of Fig. 13 may be used in which the rod has a squared end section, $41^1$.

The manner in which these last described constructions operate with no accompanying movement of the clutch members along the main shaft and consequently no progressive movement of the manual control lever will be understood from the foregoing general description.

In order to operate the actuators when the main shaft is not in motion, I may as in Fig. 1 mount one of the reversing gears 30 on a spline rod 42, this latter being mounted in bearings and being manually rotatable through a bevel gear connection 43, thus enabling the actuator to be manually rotated by the operator.

It is to be understood that I do not wish to limit myself to either way of adjusting the cut-off shifter, that is by power from the rotating main shaft or manually, or to the necessary inclusion of both ways in the same apparatus, but ordinarily, the alternative construction will be embodied in the same apparatus.

Having described my invention, I claim:—

1. The combination with a piston adapted to have a continuous movement in a plane and an intermittently rotative abutment-provided member coöperative with the piston of a piston cut-off shiftable transverse to the plane of movement of the piston whereby the effective area of the piston may be varied at will.

2. The combination with a piston and an intermittently rotative abutment-provided member coöperative with the piston of a piston cut-off shiftable to and fro to vary the effective area of the piston, said cut-off partaking of the motion of the piston.

3. The combination with a rotary disk, a wing extending therefrom and constituting a piston and an intermittently rotative abutment-provided member coöperative with the piston of an annulus constituting a piston cut-off and having an internal diameter substantially equal to the diameter of the said disk and an external radius substantially equal to the end radius of said piston, said annulus being fitted to likewise slide over the longitudinal radial faces of the piston and a filler ring having a cut-out portion to accommodate said cut off annulus.

4. The combination with a wing piston and a piston cut-off of an abutment-provided member and a shifter adapted to adjust simultaneously said cut-off and said member whereby the effective area of the piston may be varied at will.

5. The combination with a revolving wing piston and an intermittently rotative abutment-provided member adapted to coöperate with said piston of a piston cut-off adapted to be shifted across the space swept through by the piston whereby the effective area of the latter may be varied and means for varying the area of the abutment walls coöperative with the piston in accordance with the position given to the piston cut-off.

6. The combination with a revolving wing piston and an intermittently rotative abutment-provided member slidably mounted to move axially and adapted to coöperate with said piston of a piston cut-off rotative with said piston and adapted to be shifted across the space swept through by the piston in line with the shifting movement of the abutment-provided member and a shifter for effecting such sliding movement.

7. A rotary engine with piston of variable area, the same comprising in combination, a revolving piston, an intermittently rotative member provided with abutments adapted to successively coöperate with said piston and with intervening recesses adapted to permit the passage of the revolving piston, a piston cut-off for varying the effective area of the piston, said cut-off being shiftable axially of the plane of rotation of the piston, a cut-off shifter for adjusting the cut-off and said abutment-provided member axially as aforesaid, an intermittent driving mechanism for imparting an intermittent motion to the abutment-provided member.

8. The combination with a revolving piston and a shaft to which the piston is secured, of a piston cut-off shiftable axially of the piston, a cut-off shifter and lever control mechanism for adjusting the shifter.

9. The combination with a revolving piston and a shaft to which the piston is secured of a piston cut-off shiftable axially of the piston, a cut-off shifter, clutch mechanism for adjusting the shifter from the shaft.

10. The combination with a revolving piston and a shaft to which the piston is secured and an intermittently rotative abutment-provided member coöperative with the piston of a piston cut-off, a cut-off shifter and hand operated mechanism for adjusting said shifter.

11. The combination with a revolving piston and a shaft to which the piston is secured of a piston cut-off, a cut-off shifter, a clutch mechanism for adjusting said shifter from the rotating shaft and means for manually adjusting the shifter.

12. The combination with a revolving piston and a shaft to which the piston is secured of a piston cut-off, a cut-off shifter and mechanism comprising a threaded rod for adjusting said shifter.

13. The combination with a revolving piston and a shaft to which the piston is secured of a piston cut-off, a cut-off shifter, a threaded rod for adjusting the shifter, a pair of clutches on the shaft for imparting direct and reverse motions from the shaft and gearing interposed between the shaft and the threaded rod.

14. The combination with a shifter for adjusting the position of a piston cut-off of mechanism for actuating the shifter comprising a carriage, a direct and a reversing clutch mounted on the shaft, a pair of gears mounted on the carriage and connecting with said respective clutches and a threaded rod coöperating with said gears on the carriage.

15. The combination with a shifter for adjusting the position of a piston cut-off and a shaft of mechanism for actuating the shifter comprising a carriage, a direct and a reversing clutch mounted on the shaft, a pair of gears mounted on the carriage and connecting with said respective clutches, a threaded rod coöperating with said gears on the carriage, said clutches being adapted to move axially along the shaft and the carriage to move with the axially moving clutches, and a hand lever for rendering either clutch at will operative.

In testimony whereof I have signed this specification in the presence of two subscribing witnesses.

SINCLAIR J. JOHNSON.

Witnesses:
JOHN C. KOPF,
M. J. WERNER.

---

Copies of this patent may be obtained for five cents each, by addressing the "Commissioner of Patents, Washington, D. C."